United States Patent [19]
Stumpf

[11] Patent Number: 5,235,753
[45] Date of Patent: Aug. 17, 1993

[54] CIRCULAR SAW LOWER GUARD CHIP DEFLECTOR

[75] Inventor: William R. Stumpf, Kingsville, Md.
[73] Assignee: Black & Decker Inc., Newark, Del.
[21] Appl. No.: 854,526
[22] Filed: Mar. 20, 1992
[51] Int. Cl.⁵ .................................... B23D 45/16
[52] U.S. Cl. ..................................... 30/391; 30/390
[58] Field of Search ............... 30/391, 390, 388, 124; 83/100, 478

[56] References Cited

U.S. PATENT DOCUMENTS

| | | | |
|---|---|---|---|
| 3,123,111 | 3/1964 | Mattson | 30/390 |
| 3,662,796 | 5/1972 | Batistelli | 30/124 |
| 3,706,332 | 12/1972 | George | 30/391 |
| 3,812,584 | 5/1974 | Peter | 30/391 |
| 4,672,746 | 6/1987 | Zeilenga | 30/391 |
| 4,675,999 | 6/1987 | Ito et al. | 30/124 |
| 4,982,501 | 1/1991 | Sauerwein et al. | 30/376 |
| 5,084,972 | 2/1992 | Waugh | 83/100 |

FOREIGN PATENT DOCUMENTS 8413157 8/1984 Fed. Rep. of Germany.
9004162 7/1990 Fed. Rep. of Germany.
1155406 6/1969 United Kingdom.

*Primary Examiner*—Frank T. Yost
*Assistant Examiner*—Hwei-Siu Payer
*Attorney, Agent, or Firm*—Dennis A. Dearing; John D. Del Ponti; Charles E. Yocum

[57] ABSTRACT

A circular saw comprises a motor housing 13 and a shoe 15 attached to housing 13. An upper guard 17 fixed to housing 13 shields an upper portion of blade 25. A lower guard is pivotally mounted relative to the blade axis of rotation 27. The lower guard has an extended position (FIG. 1) for covering a lower portion of blade and retracted position (FIG. 2) for exposing the lower blade portion for cutting. A chip deflector 67 is formed on the radial extremity of the trailing edge 55 of lower guard 19 to prevent the build up of sawdust chips on trailing edge 55 by guiding the chips inwardly toward blade axis 27 and into the path of blade 25. As blade 25 rotates during cutting, the chips are collected in a gullet 82 between adjacent teeth 79 and are thereafter expelled from the saw 9 Claims, 4 Drawing Sheets

CIRCULAR SAW LOWER GUARD CHIP DEFLECTOR

FIELD OF THE INVENTION

This invention relates to portable electric power tools and more particularly to circular saws for cutting wood and similar materials.

BACKGROUND OF THE INVENTION

Conventional electric portable circular saws have a shoe for engaging and supporting the saw on a work piece for cutting. An upper guard is fixed to and extends above the upper shoe surface and covers an upper portion of the blade. A lower guard is pivotally mounted relative to the blade axis of rotation and is rotatable between an extended position for covering a lower portion of the blade which extends through the shoe and a retracted position for exposing the lower blade portion for cutting. The lower guard has a smaller diameter than the upper guard and is retractable within the upper guard when the lower guard is moved between its extended position and its retracted position. The lower guard in the extended position and relative to the blade feed direction has a leading edge and a trailing edge. In the retracted position of the lower guard, the trailing edge is located within the upper guard forwardly of the blade axis of rotation and generally disposed above the intersection (during cutting) of the blade tip with the workpiece ("cutting site"). When cutting, chips are propelled upwardly from the cutting site into the upper guard and flow through a chip flow duct defined by and between the upper and lower guards. For optimum operation, chips must flow freely and cleanly through the chip flow duct.

In certain types of these conventional circular saws which are designed for the European market, poor chip flow has been found to be a particular problem. One reason which is believed to contribute to the poor chip flow is that such saws are commonly equipped with a riving knife which rides in the kerf. The knife is mounted in the region adjacent to the upper and lower guards of the saw and restricts the available volume for the central and rear portions of the chip flow duct. A second reason is that in circular saws having a depth of cut pivot in the front of the saw, the pivot assembly also restricts the available volume for the front portion of the chip flow duct. A third reason is that European safety regulations limit the size of the openings and clearances for the upper guard and thus require the chip flow path to be somewhat restricted. Lastly, in certain cutting conditions such as the cutting of wet, soft wood, the generation of elongated wood chip or strands is prevalent during cutting. This is particularly true in Europe where lumber is not kilned dried as it is in the United States. The longer chips or strands have greater difficulty flowing through the duct.

SUMMARY OF THE INVENTION

In accordance with the invention, when testing of conventional prior art circular saws of the foregoing general type and experimental prototypes of the foregoing types, it has been found that chips and strands (collectively referred to as "chips") of the workpiece tend to collect on the radial extremity of the trailing edge of the lower guard which, in the retracted position of the lower guard, is proximate to the cutting site.

A primary object of the present invention is to provide an improved circular saw having improved chip flow and more particularly a chip deflector for preventing the build up of saw dust chips in the chip flow duct formed by the upper and lower guards.

In accordance with the invention as embodied and described herein, a circular saw comprises a motor housing and an output spindle extending the housing for supporting a blade for rotation about an axis. A shoe is attached to the housing and has an upper surface, a lower surface for engaging a workpiece, and an opening for receiving the blade. An upper guard is fixed to and extends above the upper shoe surface and covers an upper portion of the blade. A lower guard is pivotally mounted relative to the axis of the blade rotation and is retractable at least partially within the upper guard. The lower guard has an extended position for covering a lower portion of the blade and a retracted position for exposing the lower blade portion for cutting. In the extended position and relative to the blade feed direction, the lower guard has a leading edge and a trailing edge. The lower guard trailing edge is located in the upper guard when the lower guard is in the retracted position. A chip deflector is formed on the radial extremity of the trailing edge for guiding chips on the radial extremity of the trailing edge toward the path of blade rotation for removal by the blade.

Preferably, the lower guard has a generally annular peripheral outer wall and a pair of sidewalls. Each sidewall extends transverse to the axis of blade rotation. The chip deflector preferably comprises a tapered tip which extends from the outer wall of the lower guard and a pair of tapered sidewalls. Each deflector sidewall is coplanar respectively with one of the lower guard sidewalls and has an edge facing generally in the same direction as the tip points and slanting radially inwardly and rearwardly from the tip point. The chip deflector edges guide chips collected on the deflector edges inwardly toward the axis of blade rotation into the path of blade. A continuous cleaning action is provided as chips collected on the deflector edges are collected in the gullets between adjacent saw blade teeth and are expelled from the saw during the normal blade rotation.

Additional objects and advantages of the invention will be apparent from the detailed description of the preferred embodiment, the appended claims and the accompanying drawings or may be learned by practice of the invention.

BRIEF DESCRIPTION OF THE DRAWINGS

The accompanying drawings which are incorporated in, and constitute a part of, this specification illustrates an embodiment of the invention and together with the description serve to explain the principles of the invention.

FIG. 1 shows the saw with a lower blade guard in a fully extended position which is normally assumed by the guard when disengaged from a workpiece.

In FIG. 2, the lower blade guard is shown in the fully retracted position which is assumed by the guard when the blade has fully entered a workpiece.

DESCRIPTION OF THE PREFERRED EMBODIMENT

The preferred embodiment of this invention, as illustrated in FIGS. 1-5, is a portable electric power tool 11 used for cutting wood and similar materials and commonly referred to as circular saw.

Figure 1:
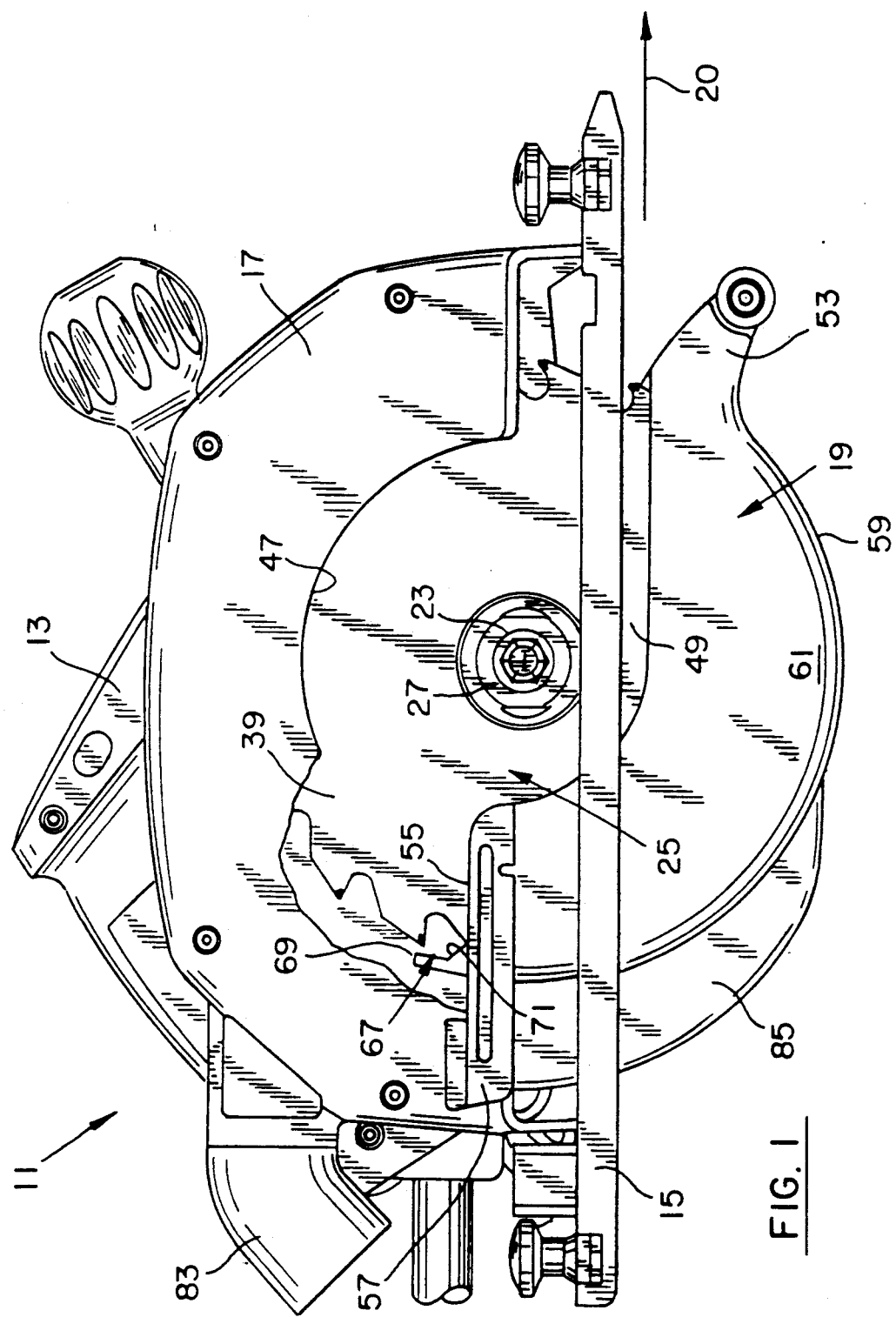
FIG. 1 is a side elevational view of a circular saw in accordance with the present invention.
Figure 2:
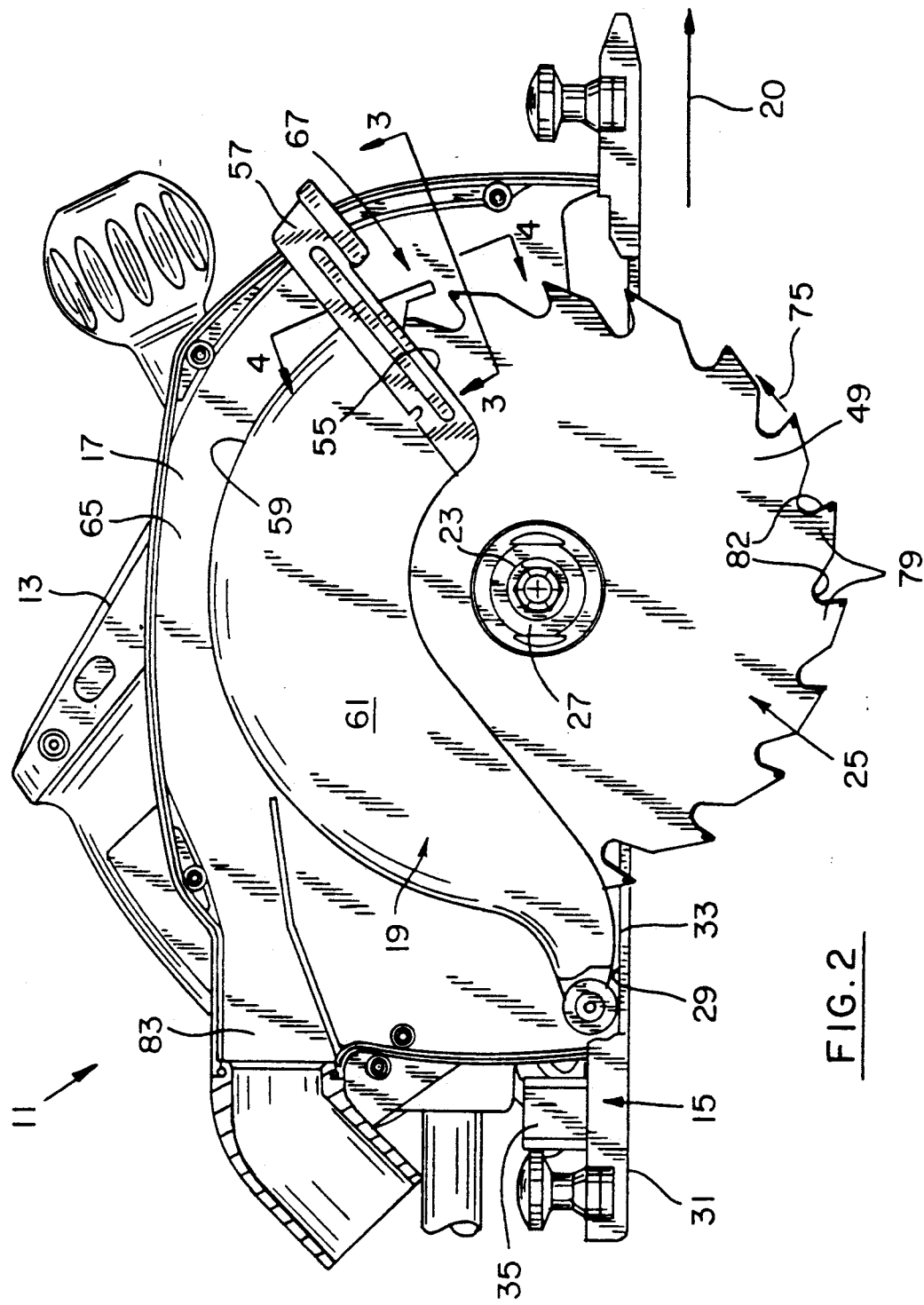
FIG. 2 shows a fragmentary side elevational view of the circular saw shown in FIG. 1.
Figure 3:
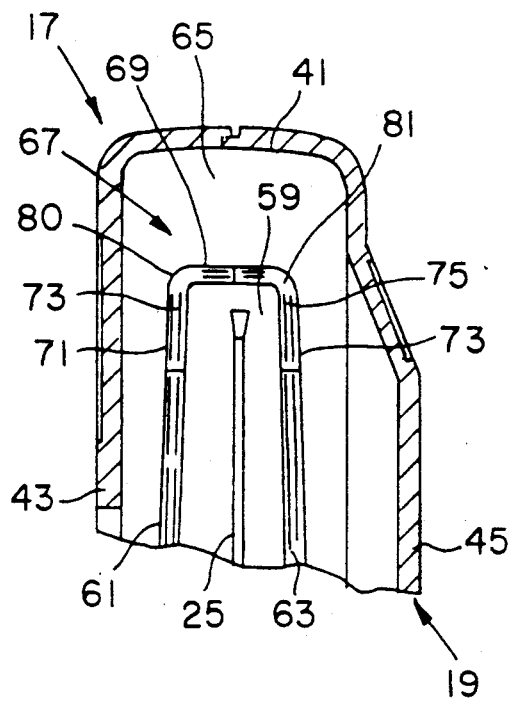
FIG. 3 is a fragmentary elevational view taken along line 3—3 of FIG. 2 showing a chip deflector and the surrounding environment.
Figure 4:
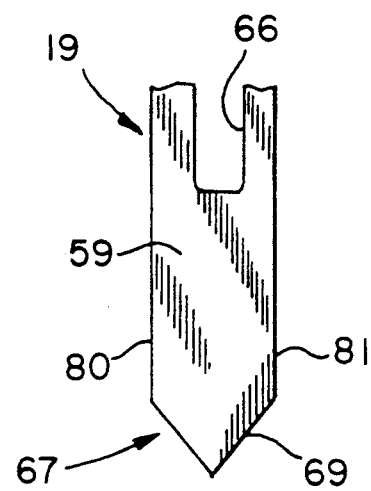
FIG. 4 is a fragmentary elevational view taken along line 4—4 of FIG. 2 showing the chip deflector.

In brief, as best shown in FIGS. 1, 2, circular saw 11 comprises a motor housing 13, a shoe 15 for supporting the saw in engagement with a workpiece, an upper blade guard 17 and a lower blade guard 19. FIG. 1 shows the lower guard 19 in the fully extended position. FIG. 2 shows the lower guard 19 in the fully retracted position. For illustrative purposes, in FIG. 2, the right half of the upper guard 17 has been removed and a portion of the shoe 15 has been broken away.

In the following detailed description the terms upper and lower are used for convenience to describe locations above and below shoe 15 on the assumption that saw 11 is resting with shoe 15 on a horizontal work surface. Similarly, the terms front and rear are used for convenience to describe relative locations by adopting the convention that front and rear are determined by the orientation of the saw relative to the direction of feeding a blade through a workpiece. It will be appreciated by those skilled in the art that other conventions may be adopted and the use of such terms is intended to identify relative locations rather than to imply that the invention is limited to use in a particular orientation.

According to the invention, an output spindle 23 extending from housing 13 supports a blade 25 for rotation about an axis 27. As embodied herein, output spindle 23 is driven through a conventional universal motor and gear train which may be of a conventional construction and which form no part of the present invention. Blade axis 27 is coaxial with the longitudinal axis of spindle 23 and extends perpendicular to the sides of blade 25.

According to the invention, shoe 15 attached to housing 13 has an upper surface 29, a lower surface 31 and an opening 33 for receiving blade 25. As embodied herein and best shown in FIGS. 1, 2, preferably, shoe 15 is pivotably attached to housing 13 for movement about an axis parallel to blade axis 27 by pivot 35 located at the rear of housing 13. Rear pivot 35 permits the blade 25 to be adjusted for depth of cut through opening 33 and relative to lower shoe surface 31 in accordance with well known principles which form no part of the present invention and will not be described in detail.

Also, for a bevel angle adjustment, shoe 15 is pivotally attached for movement about an axis perpendicular to blade axis 27 by a pivot (not shown) located at the front of the housing. Similarly, the bevel angle adjustment mechanism, forms no part of the present invention and will not be described in detail. Suitable rear pivot and bevel and angle adjustment mechanisms are fully disclosed, e.g., in U.S. Pat. No. 4,982,501.

According to the invention, upper guard 17 is fixed to housing 13 and extends above upper shoe surface 29 and covers an upper portion 39 of blade 25. As embodied herein and best shown in FIGS. 1-3, preferably, upper guard 17 comprises a generally annular, elongated in the fore and aft direction, peripheral wall 41 and a pair of sidewalls 43, 45 which extend transverse to blade axis 27. The inner upper guard sidewall 43 extends to a location adjacent to she 15. Outer upper guard sidewall 45 has an arcuate cutout 47 (FIG. 1) to expose the central portion of blade 25.

According to the invention and best shown in FIG. 1, 2, lower guard 19 is pivotally mounted relative to blade axis 27 and is rotatable at least partially within upper guard 17. Lower guard 19 has an extended position shown in FIG. 1 for covering a lower portion 49 of blade 25 and a retracted position shown in FIG. 2 for exposing lower blade portion 49 for cutting. Further, lower guard 19 in the extended position (FIG. 1) and relative to the blade feed direction 20 has a leading edge 53 and a trailing edge 55. Trailing edge 55 is located in upper guard 17 when lower guard 19 is in the retracted position (FIG. 2). As embodied herein, preferably, as is well known, when cutting, leading edge 53 of lower guard 19 is rotatably mounted on a boss (not shown) surrounding output spindle 23. Also, as is well known, lower guard 19 is spring biased into the extended position by a spring (not shown) and is movable against the bias of the spring from the extended position progressively into the retracted position when moving the saw in the blade feed direction 20 into and through workpiece. The leading edge 53 initially engages a workpiece edge and is progressively retracted as the saw blade is advanced into the workpiece until guard 19 is fully retracted (FIG. 2) with leading edge 53 in engagement with the workpiece surface. Also, the position of guard 19 may be adjusted manually through operation of a handle 57 fixed to guard 19. As will be apparent from a comparison of FIGS. 1 and 2 trailing edge 55 is located in upper guard 17 rearwardly of blade axis 27 when lower guard 19 is in the extended position and is located in upper guard 17 forwardly of blade axis 27 when lower guard 19 is in the retracted position. Trailing edge 55 is progressively movable in an arc about blade axis 27 between the locations shown in FIGS. 1 and 2 when lower guard 19 is moved from its extended position to its retracted position.

Also, the lower guard 19 (FIG. 3) preferably has a generally annular peripheral outer wall 59 and a pair of sidewalls 61, 63. Each sidewall 61, 63 extends transverse to the axis of blade rotation 27. When lower guard 19 is in the retracted position (FIG. 2), lower guard peripheral wall 59 is located radially inwardly of upper guard peripheral wall 41, is located forwardly of blade axis 27 and defines a chip flow duct 65 with the upper guard peripheral wall 41 and the upper guard sidewalls 43, 45. Outer wall 59 has an annular slot 66 for aiding the expulsion of chips from inside guard 19.

In accordance with the invention, a chip deflector 67 is formed on the radial extremity of the trailing edge 55 for guiding chips on the radial extremity of the trailing edge 55 inwardly toward the pat of blade rotation for removal by blade 25. As embodied herein and best shown in FIGS. 3-6, preferably, chip deflector 67 comprises a tapered tip 69 pointing in the direction opposite to the direction of blade rotation 75 (FIG. 6) and a pair of slanted sidewalls 71, 73. The direction of blade rotation 75 is defined by the path of a point on the outer most periphery of a blade tooth. Each deflector sidewalls 71, 73 has an edge 75, 77 facing generally in the same direction as tip 69 points and slanting radially inwardly and rearwardly from tip 69. Edges 75, 77 guide chips collected on edges 75, 77 inwardly toward blade axis 27 into the path of blade 25 where the chips are engaged by saw blade teeth 79. As the blade rotates, the teeth 79 then move the chips along chip flow duct 65 where the chip may be expelled from the saw through a saw dust extraction chute 83 or by dropping off of the teeth as the teeth rotate outwardly from upper guard 17.

Figure 5:
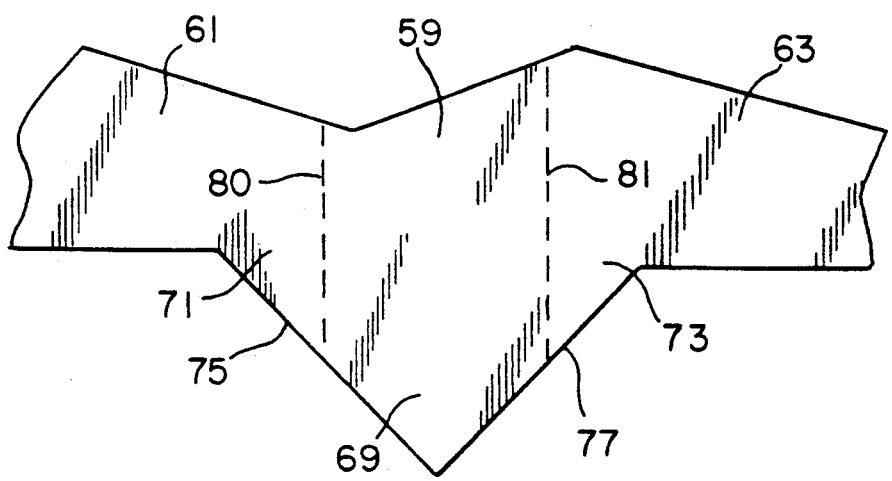
FIG. 5 is a schematic view of the chip deflector when bent into a planar configuration.

Tip 69 and sidewalls 71, 73 are preferably configured such that, if the deflector sidewalls 71, 73 are bent about edges 80, 81 to be coplanar with tip 69, tip 69 and sidewalls 71, 73 form an isosceles triangle as shown in FIG. 5. FIG. 5 shows the hypothetical configuration of tip 69 and sidewalls 71, 73 if bent from the configuration shown in FIGS. 3, 6 to a planar configuration.

Saw dust chute 83 is connected to a vacuum pickup and operates in accordance with well known principles which form no part of the present invention. Accordingly, chute 83 will not be described in detail.

Saw 11 further comprises a riving knife 85 (FIG. 1), which is conventional on European circular saws. Knife 85 forms no part of the present invention and will not be described.

Figure 6:
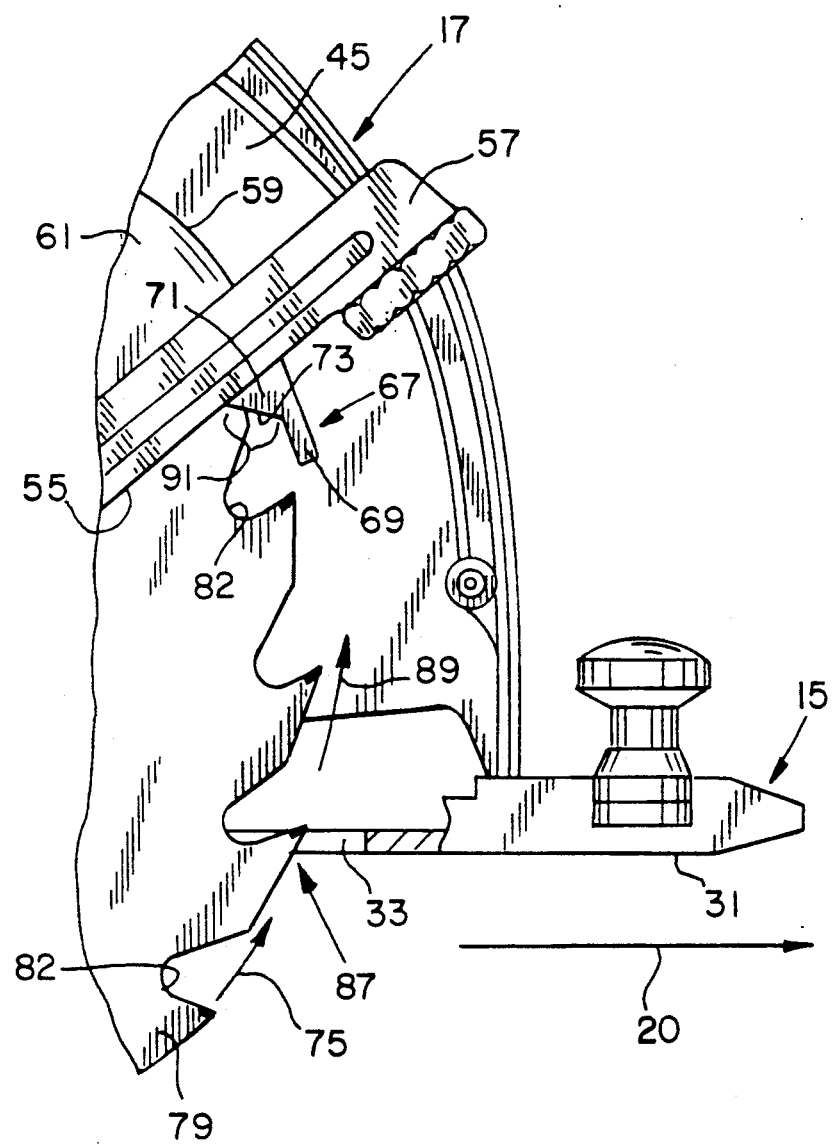
FIG. 6 is an enlarged fragmentary side elevational view of a portion of FIG. 2.

In operation and best shown in FIG. 6, workpiece chips are generated at a cutting site 87 defined by the intersection of the outer periphery of saw blade teeth 79 with the lower surface 31 of shoe 15 and are propelled along chip flow path 89. Chips tending to collect on tip 69 slide counterclockwise along tip 69 and sidewalls 71, 73 toward a location 91 in the path of blade 25. Also, chips tending to collect on deflector sidewalls 71, 73 are guided radially inwardly and rearwardly to location 91 which lies in the blade path. As blade 25 is driven in a counterclockwise direction 75, chips are pulled by blade 25 from location 91 of trailing edge 55 and are collected in the gullet 82 between teeth 79. Such chips are then expelled from the saw either through chute 83 or are expelled from the saw by falling out of gullet 82 as gullet 82 rotates into a location below shoe 15. In this manner, any chips collecting on trailing edge 55 of guard 19 are moved counterclockwise and inwardly into the path of blade 25 and are removed by blade 25 to provide a continuous cleaning action.

The contribution provided by the present invention is twofold. First, the prior art problem of poor chip flow has been analyzed, and it has been discovered that chips hanging on the radial extremity of the trailing edge of the lower guard is a significant impediment to good chip flow. Secondly, by the provision of a simple, low cost chip deflector, the problem of chip build up on lower guard 19 is solved by use of the normal rotation of the blade during cutting.

It will be apparent to those skilled in the art that various modifications and variations can be made in the preferred embodiment of the present invention without the departing from the scope or spirit of the invention. Thus, it is intended that present invention cover these modifications and variations provided they come within the scope of the appended claims and their equivalents.

I claim:

1. A circular saw comprising:
a motor housing;
an output spindle extending from the housing for supporting a blade for rotation about an axis in a first direction;
a shoe attached to the housing and having an upper surface, a lower surface for engaging a workpiece, and an opening for receiving the blade;
an upper guard fixed to the housing and extending above the upper shoe surface and covering an upper portion of the blade;
a lower guard pivotably mounted relative to the axis of blade rotation and retractable at least partially within the upper guard, the lower guard having an extended position for covering a lower portion of the blade and a retracted position exposing the lower blade portion for cutting;
the lower guard, in the extended position and relative to a blade feed direction, having a leading edge and a trailing edge;
the lower guard trailing edge located in the upper guard when the lower guard is in the retracted position; and
a chip deflector comprising a tapered tip pointing in the direction opposite to the direction of blade rotation, the chip deflector formed on a radial extremity of the trailing edge for guiding chips on the radial extremity of the trailing edge inwardly toward the blade for removal by the blade.

2. The saw of claim 1 wherein:
the lower guard has a generally annular peripheral outer wall and a pair of sidewalls, each extending transverse to the axis of blade rotation; and
the tip extends from the outer wall of the lower guard.

3. The saw of claim 2 wherein the chip deflector comprises a pair of tapered sidewalls, each coplanar respectively with one of the lower guard sidewalls and having an edge facing generally in the same direction as the tip points and slanting radially inwardly and rearwardly from the tip point.

4. The saw of claim 2 wherein the lower guard trailing edge is located in the upper guard rearwardly of the blade axis of rotation when the lower guard is in the extended position and is located in the upper guard forwardly of the blade axis of rotation when the lower guard is in the retracted position.

5. The saw of claim 1 wherein the chip deflector has a pair of deflector edges for guiding chips collected on the deflector edges inwardly toward the axis of blade rotation for removal by the blade.

6. The saw of claim 5 wherein the deflector edges are slanted in the direction of blade rotation and guide chips in the direction of blade rotation.

7. The saw of claim 1 wherein:
the tip is planar; and
the deflector further comprises a pair of deflector sidewalls extending perpendicular to the tip plane; and
the tip and deflector sidewalls are configured such that if the deflector sidewalls are bent to be coplanar with the tip, the tip and sidewalls form an isosceles triangle.

8. The saw of claim 1 wherein the chip deflector further comprises a pair of slanted sidewalls, each having an edge facing generally in the same direction as the tip points and slanting radially inwardly and rearwardly from the tip.

9. The saw of claims 1 or 3 wherein:
the upper guard comprises a peripheral wall and a pair of sidewalls;
the lower guard comprises a generally annular peripheral wall; and
when the lower guard is in the retracted position, the lower guard peripheral wall is located radially inwardly of the upper guard peripheral wall, is located forwardly of the blade axis of rotation and defines a chip flow duct with the upper guard peripheral wall and the upper guard sidewalls.

* * * * *